United States Patent
Quack et al.

(10) Patent No.: US 6,315,703 B1
(45) Date of Patent: Nov. 13, 2001

(54) PRESSURE TREATMENT ROLLER (75) Inventors: Ralf Quack, Jüchen; Wolfgang Tschirner, Tönisvorst, both of (DE)

(73) Assignee: Kleinewefers Textilmaschinen GmbH, Krefeld (DE)

( * ) Notice: Subject to any disclaimer, the term of this patent is extended or adjusted under 35 U.S.C. 154(b) by 0 days.

(21) Appl. No.: 09/310,705

(22) Filed: May 7, 1999

(51) Int. Cl.[7] .................................................. F28F 5/02
(52) U.S. Cl. ............................................. 492/46; 492/20
(58) Field of Search .................................. 492/46, 6, 7, 20, 492/27, 57, 58; 165/89, 90

(56) References Cited

U.S. PATENT DOCUMENTS

| | | | |
|---|---|---|---|
| 2,660,429 | * 11/1953 | Lorig | 492/27 |
| 3,097,590 | * 7/1963 | Justus | 492/20 |
| 3,840,958 | * 10/1974 | Mahn | 492/46 |
| 4,035,038 | * 7/1977 | Hinchcliffe et al. | 492/7 |
| 4,253,392 | * 3/1981 | Brandon et al. | 492/27 |
| 4,291,446 | * 9/1981 | Marchioro | 492/7 |
| 4,459,726 | * 7/1984 | O'brien et al. | 492/7 |
| 4,506,421 | * 3/1985 | Appenzeller et al. | 492/7 |
| 4,553,296 | * 11/1985 | Eibe | 492/4 |
| 4,683,627 | * 8/1987 | Reinhold | 492/46 |
| 4,683,628 | * 8/1987 | Schonemann | 492/46 |
| 4,760,631 | * 8/1988 | Brendel | 492/20 |
| 4,856,159 | * 8/1989 | Skytta | 492/20 |
| 4,919,761 | * 4/1990 | Schiel et al. | 162/358 |
| 4,930,202 | * 6/1990 | Yano | 492/7 |
| 4,955,268 | * 9/1990 | Ickinger et al. | 492/46 |
| 4,955,433 | * 9/1990 | Zaoralek | 492/46 |
| 5,111,564 | * 5/1992 | Pav et al. | 492/46 |
| 5,208,956 | * 5/1993 | Wenzel et al. | 492/7 |
| 5,404,936 | * 4/1995 | Niskanen et al. | 165/89 |
| 5,549,154 | * 8/1996 | Nickanen et al. | 165/89 |
| 5,567,448 | * 10/1996 | Frankland | 165/90 |
| 5,662,572 | * 9/1997 | Zaoralek | 492/20 |
| 5,899,264 | * 5/1999 | Marschke | 165/89 |
| 6,032,725 | * 3/2000 | Marschke et al. | 165/89 |

FOREIGN PATENT DOCUMENTS

WO 93/19874 * 10/1993 (WO).

* cited by examiner

*Primary Examiner*—S. Thomas Hughes
*Assistant Examiner*—T. Nguyen
(74) *Attorney, Agent, or Firm*—Darby & Darby (57) ABSTRACT

A pressure treatment roller includes a roller core and a casing tube supported on the roller core by a central support. A first intermediate space and a second intermediate space are defined on both axial sides of the central support. The intermediate spaces are each disposed between the roller core and the casing tube. The casing tube has bores interior of its outer surface. The bores are connected to a supply for a heat transfer fluid.

20 Claims, 8 Drawing Sheets

PRESSURE TREATMENT ROLLER

BACKGROUND OF THE INVENTION

1. Field of the Invention

The present invention relates to a pressure treatment roller. More specifically, the present invention relates to a pressure treatment roller that may be used to treat, for example, non-woven webs, textile material webs, webs of paper, webs of card material, plastic films or metal foils. The pressure treatment roller has a roller core and a casing tube. The casing tube is supported on the roller core by a central support. A first intermediate space and a second intermediate space are disposed on both axial sides of the central support.

2. Discussion of the Related Art

Pressure treatment rollers per se are known from, for example, German reference DE-A 17 85 197. Pressure treatment rollers interact with a counter roller to form a roller gap or nip between the two rollers. A web of material is guided and squeezed (i.e., treated) through the nip. When treating a web of material, it is an object to achieve as uniform a treatment of the web as possible over the entire width of the roller. Thus, it is desirous to apply as uniform a pressure as possible to the web over the entire width of the roller.

German reference No. DE-A 14 60 290 discloses a roller where the casing tube is supported exclusively at the center of the casing tube. The casing tube is supported on the roller core over as small a part of its length as possible. Thus, the central support is designed as a supporting disk 5. Reinforcing rings 6 are distributed over the length of the casing tube, but these reinforcing rings 6 do not contact the roller core even when the casing tube is deformed during normal use, as shown in FIG. 3 of the German '290 reference.

These types of pressure treatment rollers are known in the art as uncontrolled or "passive" deflection adjustment rollers because their structural design enables them to essentially adapt to the bending line of their counter roller.

"Active" deflection adjustment rollers use hydrostatic supporting shoes to support the roller casing on a yoke. Alternatively, active deflection adjustment rollers use a floating roller. A hydraulic fluid occupies half of the hollow space inside of the roller to support the floating roller.

In an active deflection adjustment roller, it is possible to control the temperature of the roller's outer surface by heating or cooling the hydraulic fluid. The hydraulic fluid transfers (or dissipates) heat to (or from) the roller casing, so that the surface of the roller can be controlled to have a predetermined temperature. Thus, the web of material can be treated at a predetermined pressure and at a predetermined (i.e., increased or reduced) temperature. But it is preferred not to use the same hydraulic fluid to support and heat the roller casing.

In conventional passive deflection adjustment rollers there is no hydraulic medium available to use to control the temperature of the roller.

SUMMARY OF THE INVENTION

It is an object of the present invention to control the temperature of a passive deflection adjustment roller.

This and other objects are achieved in a currently preferred exemplary embodiment of the present invention by a passive pressure treatment roller where the casing tube has bores interior of its outer surface. The bores are connected to a supply of a heat transfer medium.

The roller core and casing tube are preferably integral with one another to prevent micro-frictions from occurring in the region of the bearing surface that would exist between the roller core and the casing tube if they were not integral. These micro-frictions would result from the casing tube being stretched while the roller core is compressed due to simultaneously occurring tensile and compressive stresses during deflection of the assembly during normal use. The roller core and casing tube are also preferably integral so that the supporting width can be made significantly narrower, which results in the roller having better intimate contact against the counter roller.

The supply preferably includes at least one flexible conduit that connects the casing tube to the roller core. Because the pressure treatment roller conventionally has "free" ends, it is relatively difficult to ensure a uniform charging or filling of the peripheral bores in the casing tube. If the charging were carried out via the axial center, where the casing tube and roller core are integral with one another, it would be relatively difficult to keep the temperature of the roller surface uniform throughout its entire length (e.g., during a heating mode the center of the roller would be warmer than the axial ends of the roller). In addition, it would be difficult to produce the appropriate bores in the axial center without damaging the surface of the casing tube. The at least one flexible conduit permits a heat transfer fluid to flow through the bores in the casing tube over the entire axial length of the casing tube, without any adverse effects occurring as a result of the constantly changing distance between the roller core and casing tube, which occurs during revolution of the pressure treatment roller. The conduit is sufficiently flexible so that it compensates for these dimensional changes due to its own elastic deformation.

The at least one flexible conduit is preferably a hose. Although the changes in the geometry of the roller are relatively small during operation, repeated flexural fatigue stress is better absorbed by a flexible hose than with "rigid" conduits.

Preferably, more than one flexible conduit is disposed at one axial end face. The flexible conduits can then be distributed better, so that, for example, an installation space remains at the radial center of the axial ends of the pressure treatment roller so that an operator can access the interior of the roller.

The supply includes distributor heads disposed on the axial ends of both the casing tube and the roller core. The distributor heads at each axial end are connected to one another by the at least one flexible conduit. Thus, as soon as the heat transfer medium reaches the distributor head, it is immediately distributed to the bores in the casing tube so that the medium can flow through the casing tube in predetermined bores in a predetermined direction.

In accordance with another exemplary embodiment of the present invention, the distributor head disposed on the casing tube (i.e., the outer distributor head) preferably has annular ducts, which are in fluid communication with all of the bores. One of these annular ducts is a feed duct, which is in fluid communication with some of the bores. The cross sectional area of the feed duct becomes smaller about the circumference of the casing tube starting from the inlet of the heat transfer fluid into the feed duct. The feed duct is in fluid communication with some of the bores because each of these bores has an open end that opens into the feed duct. The heat transfer medium enters into these bores at the open end of the bore. Because the cross sectional area of the feed ducts becomes smaller as you move away from the entry of the heat transfer fluid into the duct, the heat transfer fluid is distributed uniformly to all of these bores over the circumference of the roller.

Another one of the annular ducts in the outer distributor head is an outflow duct, which is in fluid communication with the remainder of the bores. The cross sectional area of the outflow duct becomes larger about the circumference of the casing tube ending at the exit of the heat transfer fluid from the outflow duct. Each of the remainder of the bores has an open end that opens into the outflow duct. The heat transfer medium exits from the remainder of the bores at its open end into the outflow duct. The feed duct and the outflow duct are separated from one another by a wall that is located in a different position about the circumference after each bore. In other words, the wall is located in a different position between each circumferentially adjacent bore. The overall cross sectional area of the feed duct combined and the outflow duct is the same over the circumference of the roller. But the cross sectional area of the feed and outflow ducts changes due to the repositioning of the wall that separates these two ducts. Thus, depending upon how you move about the circumference, the outflow duct becomes larger by the same extent as the feed duct becomes smaller or vice versa, so that a uniform distribution of the heat transfer medium is achieved.

A displacer is preferably disposed in at least one bore. The displacer influences the flow of the heat transfer medium through the bore that it is placed in. For example, a local increase in the rate at which the heat transfer medium flows through the bore can be brought about with the aid of the displacer. Because the flow rate of the heat transfer medium influences the heat dissipation or absorption between the roller and the heat transfer medium, the temperature conditions at the surface of the roller can, therefore, be influenced locally on the outer surface of the roller. The displacer may be continuous and may, but is not required to, extend over the entire axial length of the casing tube. Of course, all of the bores are not required to have a corresponding displacer.

An orifice plate may be disposed in the flow path of at least one bore. The orifice plate acts as a throttle to influence the flow by providing a higher flow resistance. Thus, with the aid of an orifice plate, it is possible, for example, to reduce the flow rate of the heat transfer medium.

The orifice plate is preferably disposed in the distributor head because they are relatively easily accessible in this location. Thus, if required, the orifice plate can be easily exchanged, which is advantageous under certain circumstances, especially when the roller is in operation.

An outer distributor head is preferably mounted on both axial ends of the casing tube. The roller core has at least one connecting duct between the two axial end regions of the casing tube outside of the supply arrangement. Thus, the heat transfer medium can not only be fed in from one end of the casing tube, but also may be fed in from both axial ends (and, therefore, withdrawn from both axial ends). Therefore, by having a distributor head at each axial end, a greater flexibility in the choice of flow paths exists. For example, the flow through the roller may be a mono-pass, a dual-pass or a tri-pass. In other words, the heat transfer medium may flow the length of the roller once (mono-pass), twice (dual-pass) or three times (tri-pass). Especially for the mono-pass and tri-pass conducting routes, the feeding in of the heat transfer medium preferably occurs from both axial end faces of the casing tube so that the heat transfer effect will be distributed uniformly, which has the added advantage that thermal stresses in the roller core due to uneven temperatures throughout the roller can be minimized. Minimizing uneven temperatures is especially advantageous during start up because the roller core and roller casing will each heat up in essentially the same manner.

An orifice plate is preferably disposed in at least one connecting duct, which is particularly advantageous if the connecting duct operates as a bypass flow to the flow through the bore arrangement because the bypass flow rate can be maintained relatively low in spite of a large duct cross section. The roller core may have more than one axial bore that functions as a bypass for the bore arrangement so that the roller core can be uniformly heated. Thus, thermal stresses in the roller core can essentially be avoided.

The shape of the intermediate space changes the bending properties of the overall pressure treatment roller. The intermediate space preferably becomes larger in the axial direction from a central region outward. This shape provides a greater resistance to deflection in its axial center than at the axial ends. The ends of the roller are, thus, "softer" and can, accordingly, better adapt to the shape of the counter roller. The bending lines of the pressure treatment roller can, therefore, substantially match those of the counter roller. Thus, a more uniform application of pressure is achieved over the working width of the roller.

The thickness of the casing tube preferably decreases in the axial direction from the central region outward. The roller core may have a constant cross section. The bending line of the passive deflection compensating roller according to the present invention is, therefore, achieved mainly by the shaping of the casing tube.

The intermediate space preferably becomes larger continuously (i.e., gradually and without sudden changes in diameter), but not necessarily in a linear fashion. Thus, the bending properties of the casing tube changes continuously.

Alternatively, the intermediate space may become larger in a stepped manner. A stepped enlarging intermediate space is slightly easier to produce, and the bending lines produced by such a pressure treatment roller are sufficient for most purposes.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
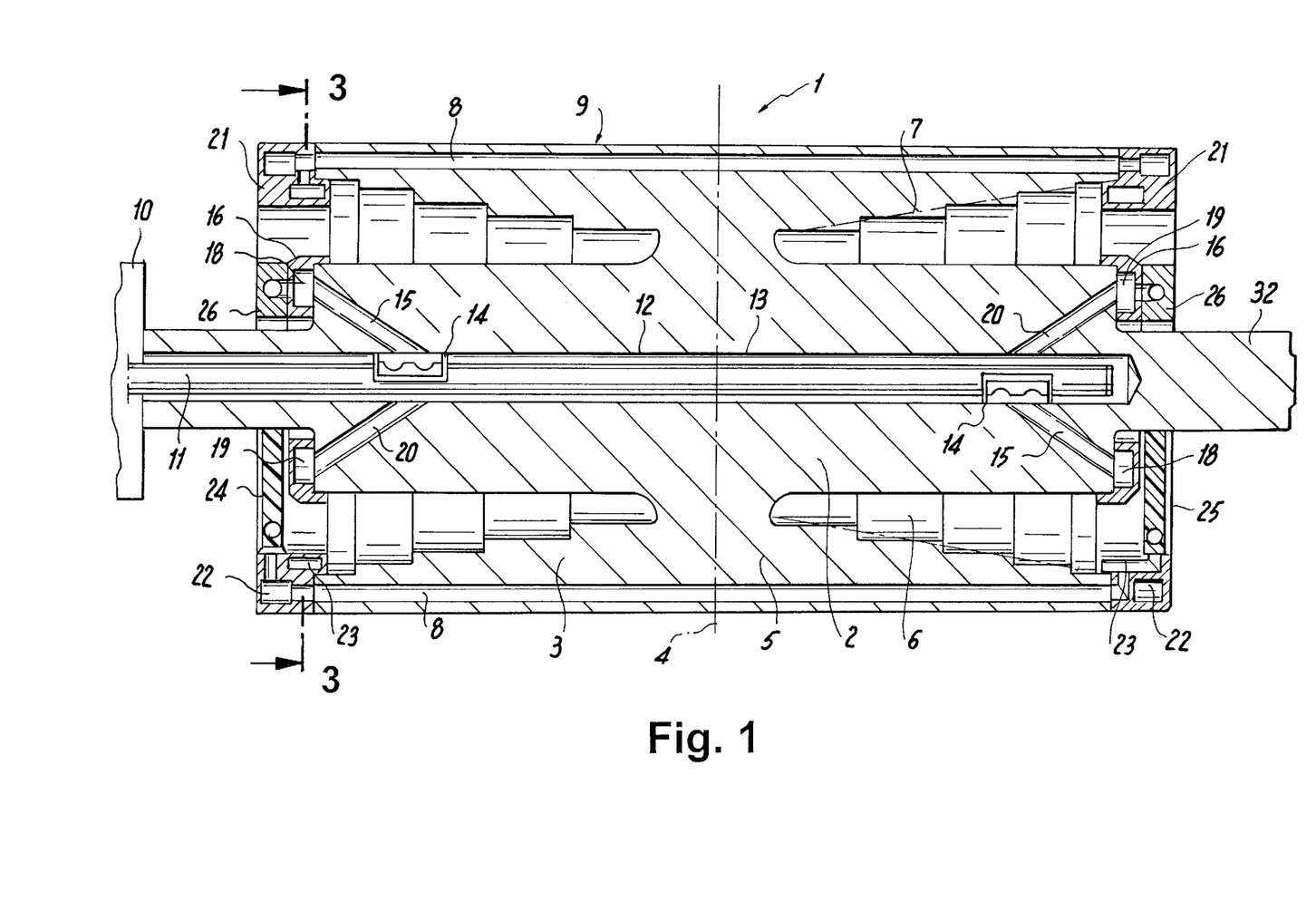
FIG. 1 is a cross-sectional view of a pressure treatment roller taken along line 1—1 of FIG. 2 and looking in the direction of the arrows.
Figure 2:
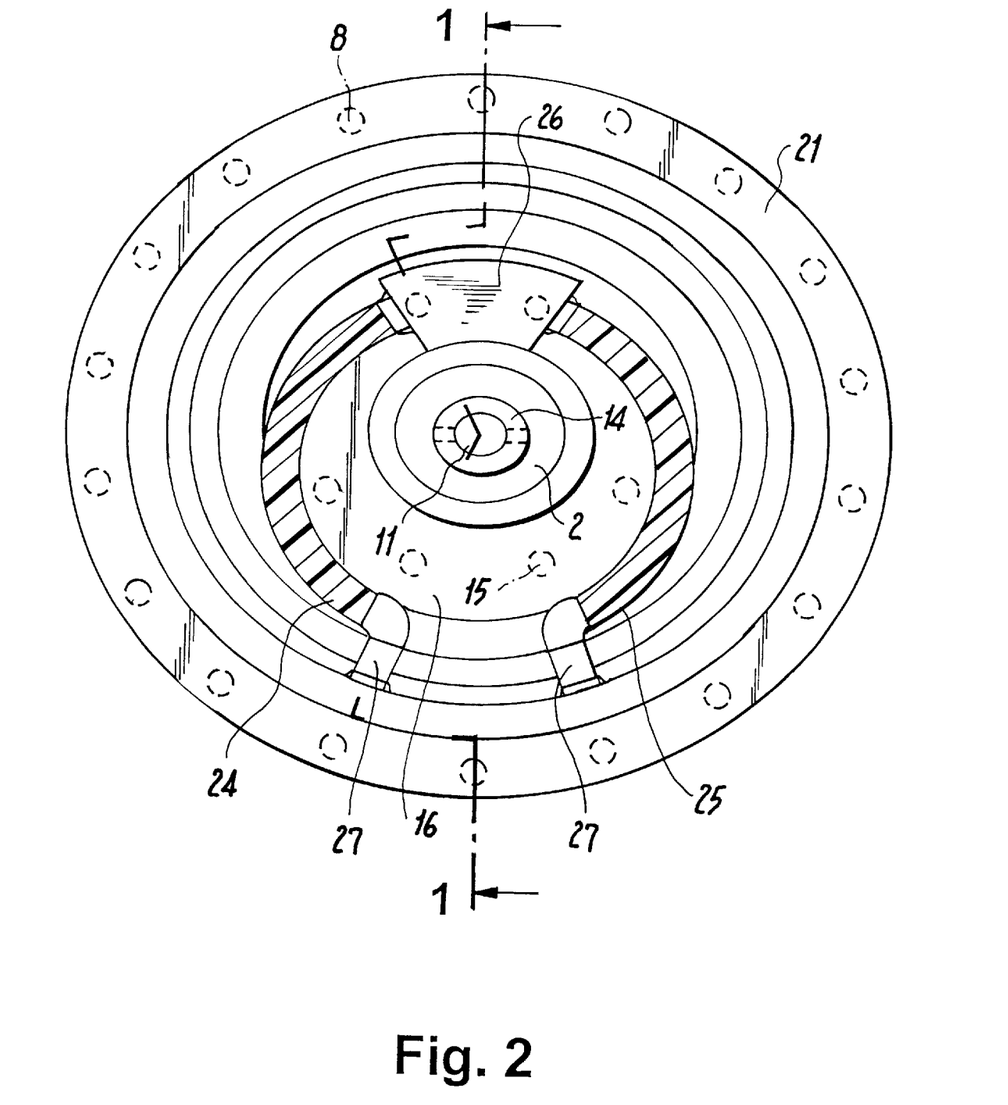
FIG. 2 is an end view of the pressure treatment roller.
Figure 3:
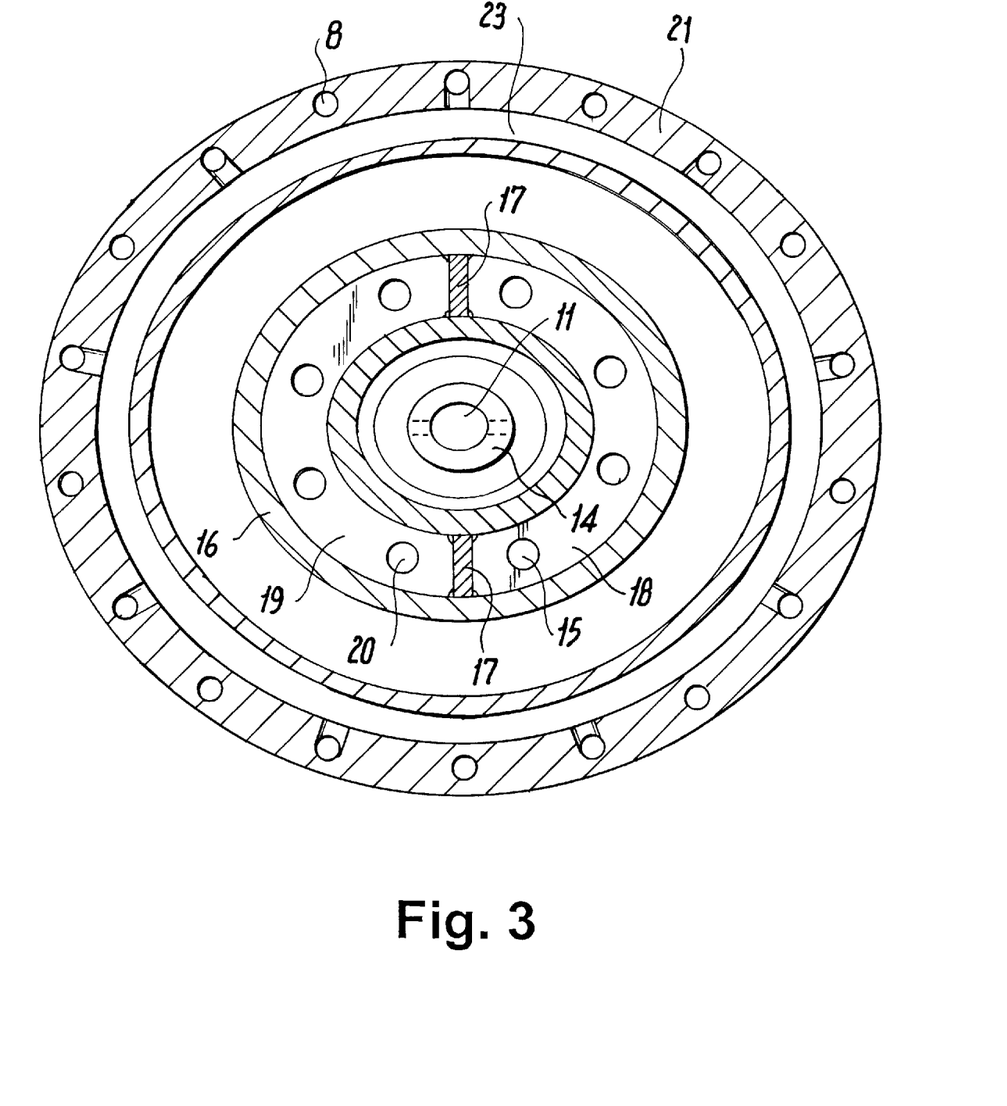
FIG. 3 is a cross-sectional view of the pressure treatment roller taken along line 3—3 of FIG. 1 and looking in the direction of the arrows.

Referring now to FIGS. 1–3, a pressure treatment roller 1 is illustrated. Pressure treatment roller 1 includes a roller core 2, which is rotatably mounted in a machine frame (not shown) in a manner known to those skilled in the art. A casing tube 3 is integrally connected to roller core 2. More specifically, casing tube 3 is connected to roller core 2 only in the region of the axial center 4 of roller core 2, by means of a support 5. A first and a second intermediate space 6 are disposed on both sides of support 5, between roller core 2 and casing tube 3. Intermediate spaces 6 have a plurality of steps so that the thickness of casing tube 3 decreases from a maximum thickness at center 4 to a step-wise smaller thickness outward axially.

Of course, instead of the stepped reduction in the wall thickness of casing tube 3, casing tube 3 may have a continuous reduction in its thickness, as is represented by dashed line 7 in FIG. 1. The decrease in thickness does not have to be linear as illustrated, but may be curved. The bending line of roller 1 is dependent upon the shape of casing tube 3. Therefore, the bending line can be influenced by choosing the curve that the decrease in thickness of casing tube 3 may follow.

Peripheral bores 8 are disposed in casing tube 3 interior of its outer surface 9. Bores 8, despite their name, need not necessarily be produced by boring. Additionally, other ducts, instead of bores 8, may be used to provide a flow path for a heat transfer medium. The heat transfer medium flows through bores 8 to influence the temperature of outer surface 9. The heat transfer medium may be, for example, steam, hot or cold oil or water, or some other liquid or gas.

The heat transfer medium is fed to pressure treatment roller 1 via a conventional rotating sealing head 10 to an inflow tube 11. Inflow tube 11 extends through the roller core over virtually the entire working width of casing tube 3. Inflow tube 11 is disposed in a central bore 12 of roller core 2. An intermediate space 13 is, therefore, formed between inflow tube 11 and the circumferential wall of central bore 12. Space 13 is used to receive a return flow of the heat transfer medium.

The heat transfer medium is directed via chambers 14 from inflow tube 11 to bores 15. Bores 15 are disposed in roller core 2. The medium is directed from bores 15 to an inner distributor ring 16. Inner distributor ring 16 encloses an annular space that is divided into two halves 18, 19 by separating walls 17. Half 18 receives the inflowing heat transfer fluid from bores 15, while half 19 receives the returning heat transfer medium from hose 25, which is connected to the outer distributor ring 21 (to be described in greater detail below). Half 19 is connected via bores 20 to intermediate space 13. inner distributor ring 16 is fixedly held against rotatable core 2 and, therefore, rotates with roller core 2.

An outer distributor ring 21 is fixedly held against casing tube 3 and, therefore, rotates with casing tube 3 (which, of course, rotates with roller core 2). An outer distributor ring 21 is disposed on each axial end face of casing tube 3. Outer distributor ring 21 has a first annular space 22 and a second annular space 23. Both annular spaces 22, 23 extend over the entire circumference of casing tube 3. A bore 8 is connected on its left axial end to annular space 22 and on its right axial end to annular space 23. The next adjacent bore in the circumferential direction is conversely connected on its right axial end to annular space 22 and on its left axial end to annular space 23.

For reasons of overall clarity in the drawing Figures, the mouths of bores 8 opening into annular spaces 22, 23 are represented as all being at the same radial distance from the axis. In fact, however, the mouths of the bores may lie on different radii.

The inner distributor ring 16 is connected via two flexible hoses 24, 25 to the outer distributor ring 21 on each axial end of the roller. Thus, there are two hoses 24 (one on each axial end) and two hoses 25 (one on each axial end). Hoses 24, 25 are preferably designed as metal hoses or at least as metal reinforced hoses. First hose 24 is used to transmit the inflow of heat transfer medium from inner ring 16 to outer ring 21 and second hose 25 is used to transmit the outflow or return flow of heat transfer medium from outer ring 21 to inner ring 16. First hose 24 is in fluid communication with first annular space 22 and second hose 25 is in fluid communication with second annular space 23. It is, therefore, possible to allow the heat transfer medium to flow through circumferentially successive bores 8 in opposite directions. This type of liquid conduction is known in the art as "mono-pass" because the heat transfer medium passes through the length of the roller only once.

Hoses 24, 25 are connected via a connecting piece 26 to inner distributor ring 16 and via two connecting pieces 27 to outer distributor ring 21.

In some cases, it is possible to dispense with inner distributor rings 16, if the corresponding hose connection is connected directly to bores 15 and 20. It is also possible to use more than two hoses per axial end so that a larger installation space can be created around the axis of rotation, which offers advantages for assembly reasons. Instead of hoses, other flexible or partially flexible conduits may also be used.

Figure 4:
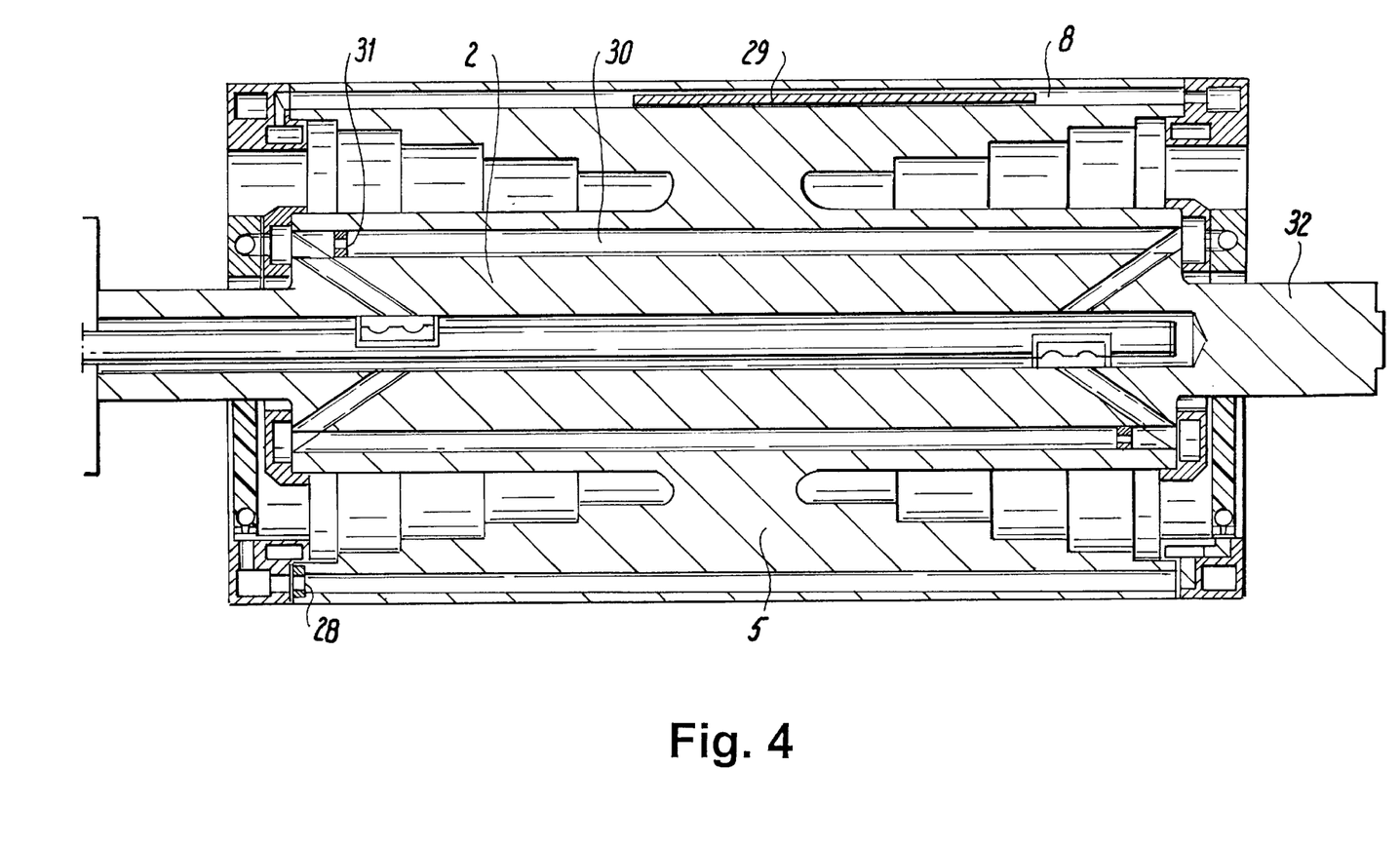
FIG. 4 is a cross-sectional view of another embodiment of a pressure treatment roller.

FIG. 4 shows a number of possible embodiments that may be used alternatively or in addition to the structure described above and illustrated in FIGS. 1–3 for pressure treatment roller 1. Only those parts that differ from the parts illustrated in FIGS. 1–3 have been given reference numerals.

Orifice plates or throttles 28 may be disposed in bores 8 to allow for a correction of the different fluid pressures that occur in annular spaces 22, 23 due to the flow dynamics. Thus, it is possible to set the necessary flow rates in bores 8. Orifice plates 28 are preferably located between casing tube 3 and outer distributor ring 21 because they are most easily accessible in this location.

Displacers 29 may be arranged in one or more bores 8. These may, but do not have to, extend over the entire axial length of bore 8. Displacers 29 may be designed, for example, as helixes. At the locations where a displacer 29 lies, the flow rate of the heat transfer medium increases because the free flow cross section is reduced.

Finally, roller core 2 may be provided with axially parallel bores or ducts 30, through which the heat transfer medium may flow to half 19 of the opposite axial end's inner distributor ring 16. Therefore, the heat transfer fluid flowing through ducts 30 bypass bores 8 to minimize thermal stresses that particularly occur during heating-up and cooling-down processes due to the relatively large temperature differences that occur in the region of central support 5.

The volumetric flow through the axially parallel ducts 30 may be adjusted with the aid of orifice plates 31.

The pressure treatment roller 1 may be operated in a trailing mode or may be directly driven. If the pressure treatment roller is directly driven, journal 32 may be rotatably driven by a flexible belt type drive, a gear drive or a universal shaft.

A specific bending and shearing rigidity can be preset in the pressure treatment roller by deliberately designing the shape of the axially outwardly decreasing wall thickness of casing tube 3.

An alternative flow route for the heat transfer medium through the pressure treatment roller is illustrated in FIGS. 5–8d. This embodiment (FIGS. 5–8d) is a mono pass deflection roller.

Figure 5:
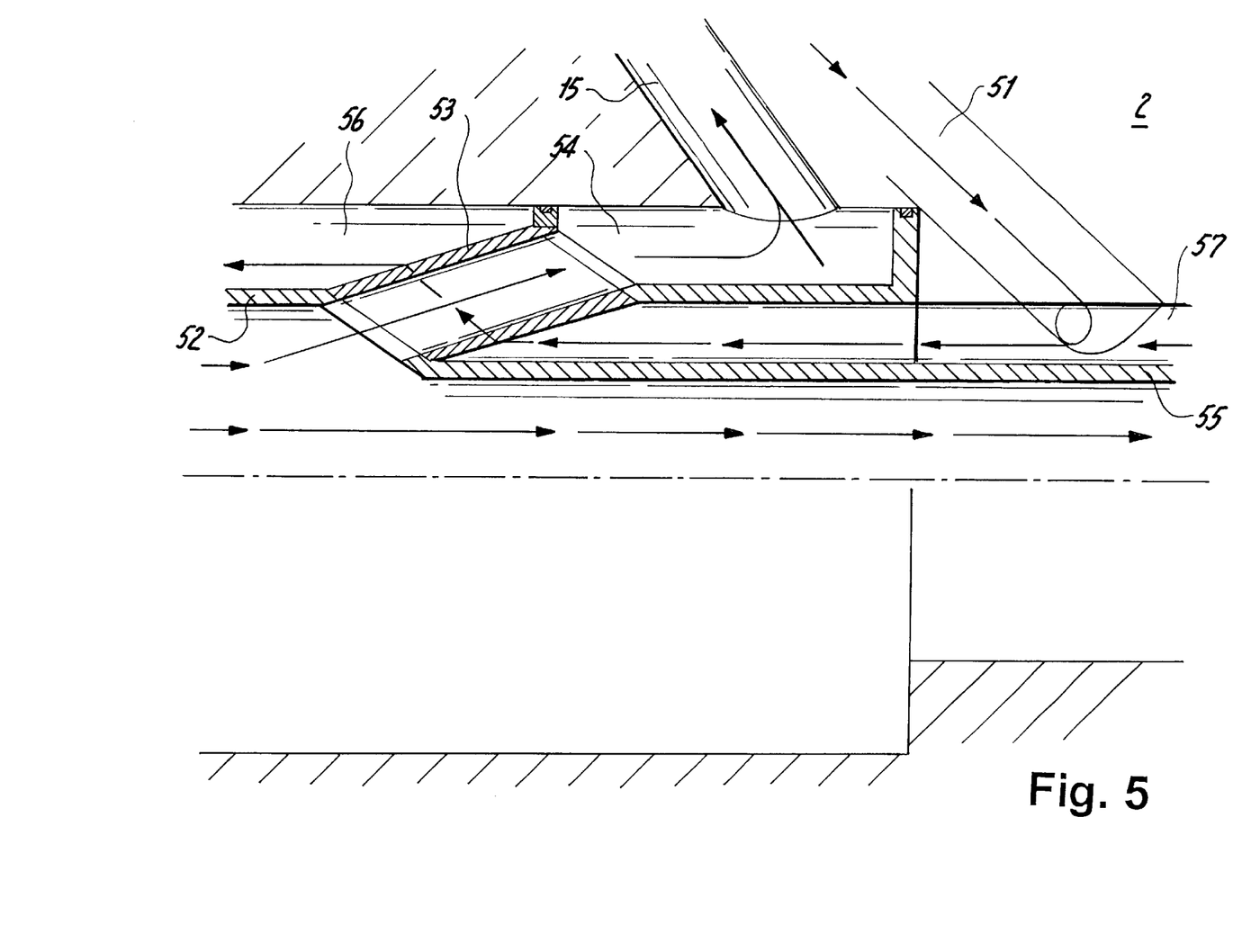
FIG. 5 is a partial cross-sectional view of yet another embodiment of a distributor head.
Figure 6:
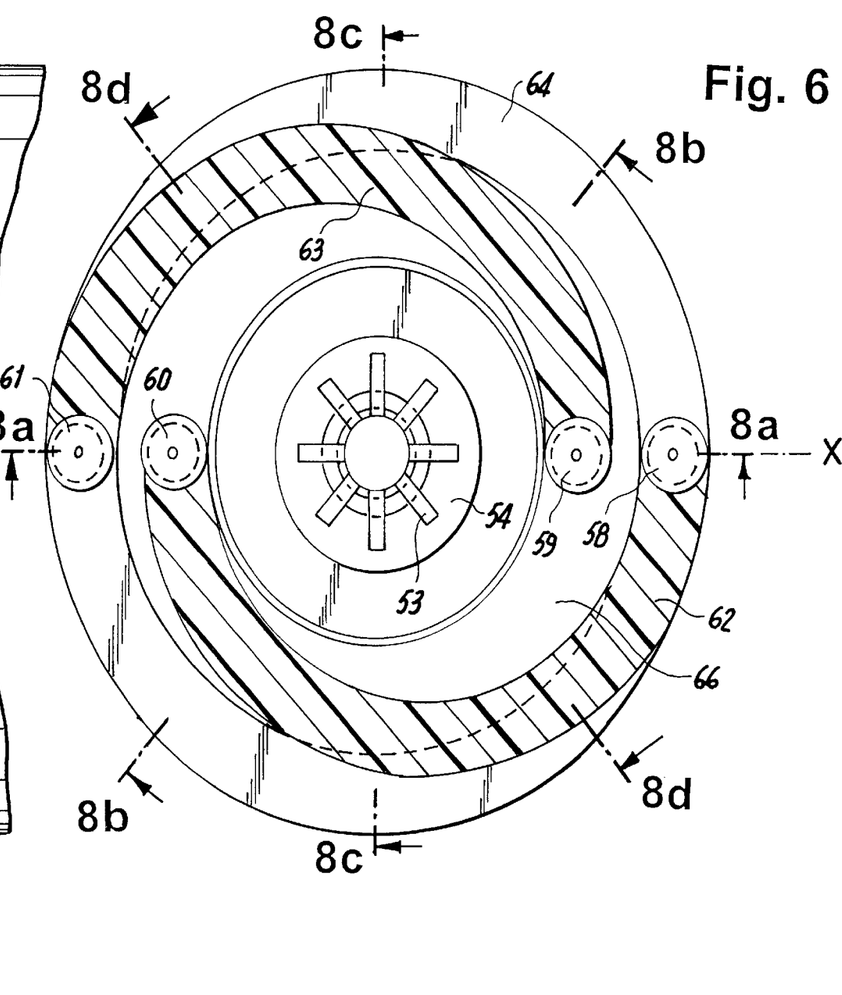
FIG. 6 is an end view of the inner and outer distributor heads.
Figure 7:
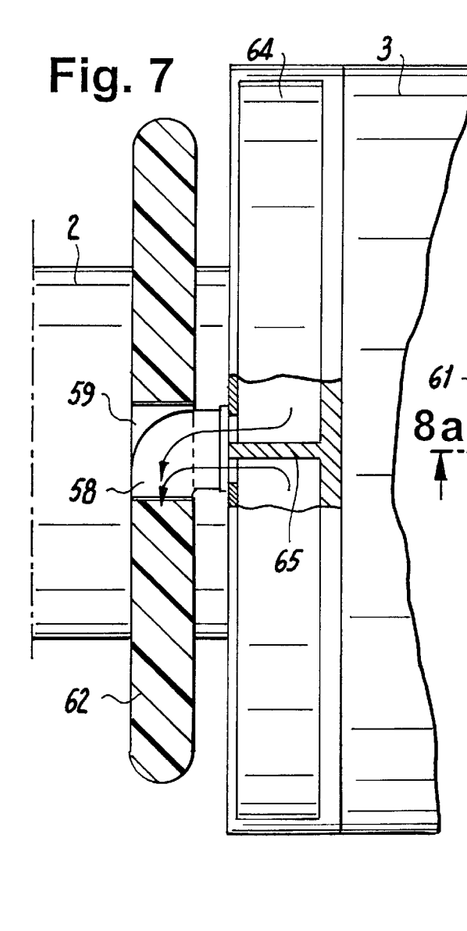
FIG. 7 is a partial cross-sectional view of the outer distributor head shown in FIG. 6.

The distributor tube shown in FIG. 5 ensures a largely symmetrical conduction of the heat transfer medium in roller core 2. The flow of heat transfer medium in tube 52, which has been fed from the rotational sealing head 10, is divided into two streams. One stream is directed into branch ducts 53 and the other stream is directed into insert tube 55. The heat transfer medium enters an annular chamber 54 from branch ducts 53. The heat transfer medium is distributed into bores 15 from annular chamber 54. The heat transfer medium is then fed to inner distributor ring 66 from bore 15. In a similar manner, the other stream of heat transfer medium passes, via insert tube 55, to the other axial end of roller core 2 and is distributed from there into bores 15, which lead to the second, inner distributor ring 66. The medium returning from inner distributor rings 66 enters smaller central bore 57 via bores 51 and is drained away out of roller 42 via the larger central bore 56 through the rotational sealing head.

Outer distributor ring 64 has the same function as the inner distributor ring 66 (i.e., both are intended to simultaneously collect and uniformly distribute the heat transfer medium). To achieve this, conduits 58–61 are designed so that the cross-sectional area of the feed duct into the bores about the circumference becomes smaller as you move circumferentially away from the inlet to the feed duct. The cross-sectional area of every drainage duct from the bores about the circumference becomes larger for the medium to be returned or drained away from the bores, as you move circumferentially toward the outlet from the drainage duct. Adjacent peripheral bores 8 in the circumferential direction in casing tube 3 have the heat transfer media therein flow in opposite directions.

Figure 8A:
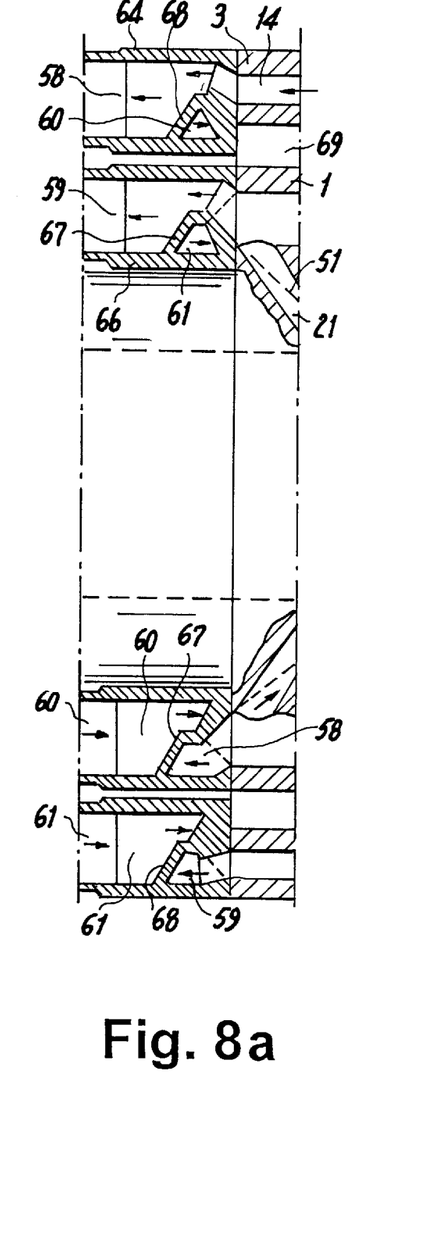
FIG. 8a is a cross-sectional view of the inner and outer distributor head taken along line 8a—8a of FIG. 6 and looking in the direction of the arrows.
Figure 8B:
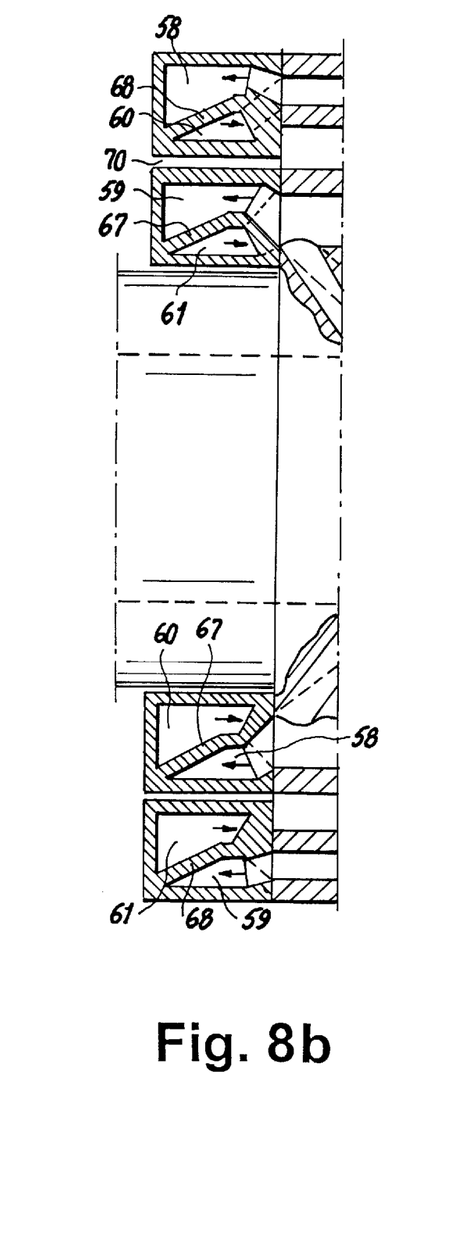
FIG. 8b is a cross-sectional view of the inner and outer distributor head taken along line 8b—8b of FIG. 6 and looking in the direction of the arrows.
Figure 8C:
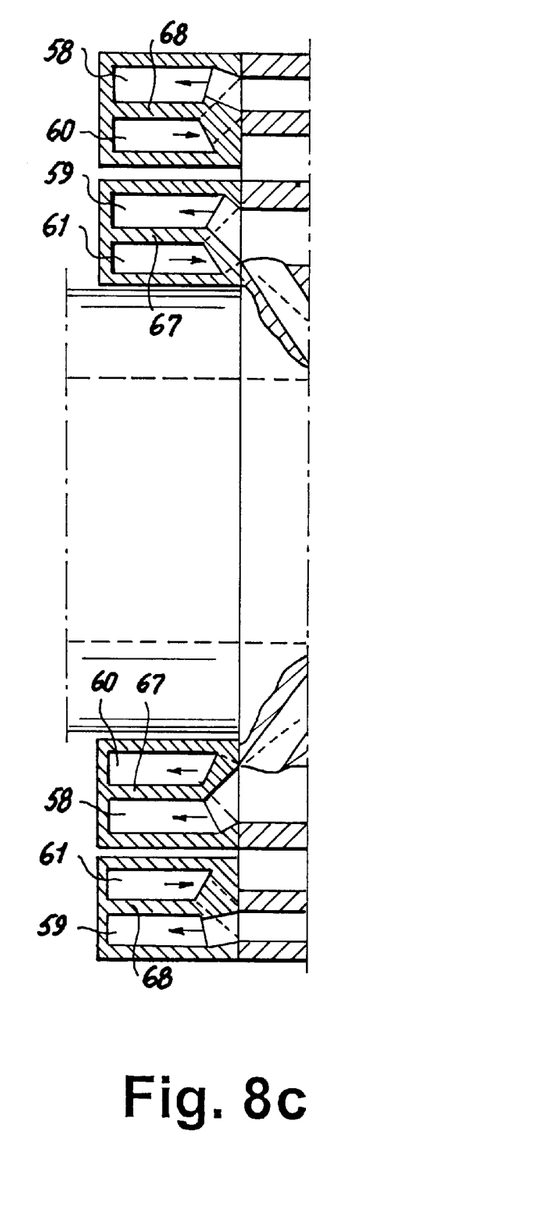
FIG. 8c is a cross-sectional view of the inner and outer distributor head taken along line 8c—8c of FIG. 6 and looking in the direction of the arrows.
Figure 8D:
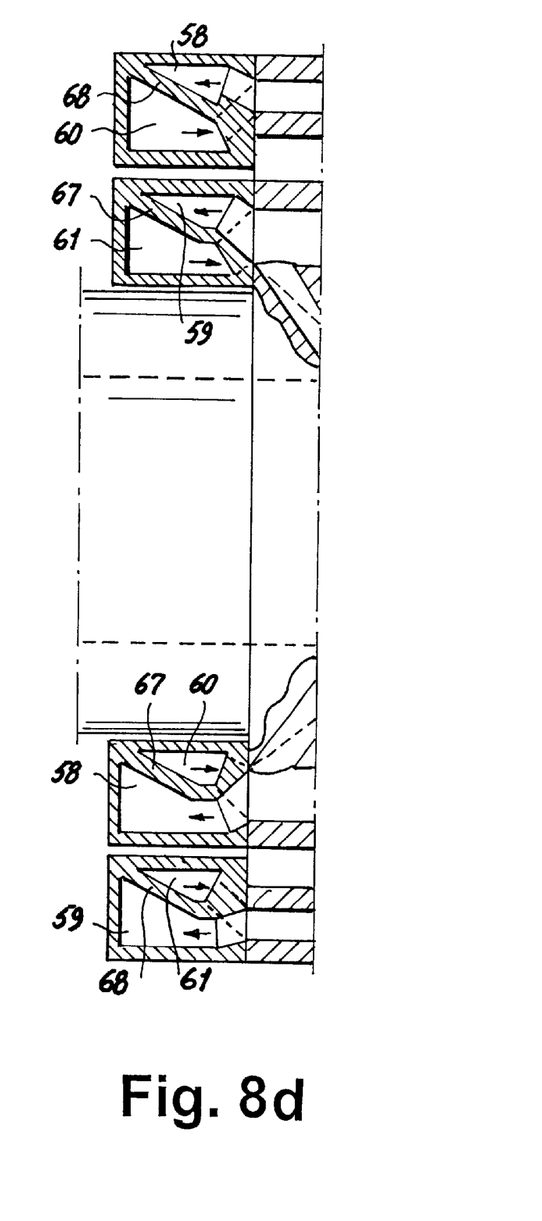
FIG. 8d is a cross-sectional view of the inner and outer distributor head taken along line 8d—8d of FIG. 6 and looking in the direction of the arrows.

Referring now to FIGS. 8a–8d, about each half of the circumference of the distributor rings 64 and 66, the cross-sectional area of the feeding in ducts 60 and 61 decreases by the amount by which the cross-sectional area of the draining away ducts 58 and 59 increases. The distributor rings 64 and 66 are structurally designed symmetrically with respect to the X-axis, as is shown in FIG. 8C (which is a sectional view at a right angle to the X-axis) where separating walls 67, 68 divide the feeding in ducts and the draining away ducts so that they have the same cross-sectional area. Ribs 65 direct the feeding in medium into the respective symmetrical duct halves and the drained away medium into the metal hoses 62 and 63 (See FIG. 7). The metal hoses 62 and 63 establish an elastic connection between the inner distributor ring 66 and the outer distributor ring 64, which is necessary since the annular gaps 69 and 70 are transformed from a concentric shape into an eccentric shape when the roller is mechanically loaded during use.

Having described the presently preferred exemplary embodiment for a pressure treatment roller in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A passive deflection adjustment pressure treatment roller comprising:
   a roller core; and
   a casing tube being supported on said roller core by only a central axial support, a first intermediate space and a second intermediate space being defined on both axial sides of said central axial support, said intermediate spaces each being disposed radially between said roller core and said casing tube;
   wherein said casing tube has bores interior of its outer surface, said bores being connected to a supply for a heat transfer fluid.

2. The roller as claimed in claim 1, wherein said roller core and said casing tube are integral with one another.

3. The roller as claimed in claim 1, wherein said supply includes at least one flexible conduit that connects said casing tube to said roller core.

4. The roller as claimed in claim 3, wherein said at least one flexible conduit is a hose.

5. The roller as claimed in claim 4, wherein said at least one flexible conduit includes more than one flexible conduit disposed at one axial end face of said roller.

6. The roller as claimed in claim 3, wherein said supply includes a first distributor ring disposed on said casing tube and a second distributor ring disposed on said roller core, said distributor rings being connected to one another by said at least one flexible conduit.

7. The roller as claimed in claim 6, wherein at least said first distributor ring has annular ducts.

8. The roller as claimed in claim 7, wherein said first distributor ring has a feed duct in fluid communication with some of said bores in said casing tube, a cross sectional area of said feed duct becoming smaller about the circumference of said casing tube.

9. The roller as claimed in claim 8, wherein said first distributor ring has an outflow duct in fluid communication with a remainder of said bores in said casing tube, a cross sectional area of said outflow duct becoming larger about the circumference of said casing tube, said feed duct and said outflow duct being separated from one another by a wall, said wall being disposed in a different position between each circumferentially adjacent bore.

10. The roller as claimed in claim 1, wherein a displacer is disposed in at least one bore.

11. The roller as claimed in claim 6, wherein an orifice plate is disposed in the flow path of at least one bore.

12. The roller as claimed in claim 11, wherein said orifice plate is disposed in said first distributor ring.

13. The roller as claimed in claim 1, further comprising a distributor ring mounted on both axial ends of said casing tube, said roller core having at least one connecting duct between the two axial end regions of said casing tube outside of said supply.

14. The roller as claimed in claim 13, wherein an orifice plate is disposed in said at least one connecting duct.

15. The roller as claimed in claim 1, wherein said intermediate spaces become larger in an axial direction from a central region outward.

16. The roller as claimed in claim 15, wherein a thickness of said casing tube decreases from a central region outward.

17. The roller as claimed in claim 15, wherein said intermediate spaces become larger continuously.

18. The roller as claimed in claim 15, wherein said intermediate spaces become larger in a stepped manner.

19. The roller as claimed in claim 2, wherein said roller core and said casing tube are of one piece.

20. The roller as claimed in claim 1, wherein said roller core has a central bore, an inflow tube being disposed in said central bore, said inflow tube being rotatable with said roller core.

* * * * *